(12) United States Patent
Dhamrat et al.

(10) Patent No.: US 11,565,613 B2
(45) Date of Patent: Jan. 31, 2023

(54) VEHICLE SEAT CONVERTIBLE INTO VEHICLE ACCESS AND LOADING TOOL

(71) Applicant: Toyota Motor Engineering & Manufacturing North America, Inc., Plano, TX (US)

(72) Inventors: Hamshivraj Singh Dhamrat, Saline, MI (US); Lindsay A. Babian, Canton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 324 days.

(21) Appl. No.: 17/039,561

(22) Filed: Sep. 30, 2020

(65) Prior Publication Data
US 2022/0097579 A1 Mar. 31, 2022

(51) Int. Cl.
B60N 2/36 (2006.01)
B60N 2/30 (2006.01)

(52) U.S. Cl.
CPC .......... B60N 2/366 (2013.01); B60N 2/3011 (2013.01); *B60N 2002/363* (2013.01)

(58) Field of Classification Search
CPC . B60N 2/366; B60N 2/36; B60N 2/32; B60N 2/3011; B60N 2/90; B60N 2002/363; B65G 69/30; B60P 1/43; B60R 3/00; B60R 3/007; B60R 3/02
USPC .......... 296/65.09, 65.16, 65.01, 69, 61, 62
See application file for complete search history.

(56) References Cited

U.S. PATENT DOCUMENTS

| 29,931 | A | * | 9/1860 | Wicklin et al. ........... B60R 3/02 280/166 |
| 6,378,927 | B1 | * | 4/2002 | Parry-Jones ............ B60P 1/435 296/61 |
| 6,698,829 | B1 | | 3/2004 | Freijy et al. |
| 7,686,367 | B2 | | 3/2010 | Neale |
| 10,040,385 | B2 | * | 8/2018 | Stevens .................... B60P 1/43 |
| 11,273,737 | B1 | * | 3/2022 | Dhamrat .................. B60N 2/36 |
| 2011/0109146 | A1 | | 5/2011 | Ida et al. |

(Continued)

FOREIGN PATENT DOCUMENTS

| DE | 102005041156 A1 * | 3/2007 | ............... B60N 2/36 |
| DE | 102005041156 A1 | 3/2007 | |
| DE | 102015012851 A1 * | 4/2016 | ............... B60N 2/44 |

(Continued)

*Primary Examiner* — D Glenn Dayoan
*Assistant Examiner* — Wenwei Zhuo
(74) *Attorney, Agent, or Firm* — Snell & Wilmer LLP

(57) ABSTRACT

A removable vehicle seat convertible from a seat configuration into a ladder or a ramp configuration and methods of converting the same. The seat may include a seat cushion having a back surface and a back end removably engaged with a floor of an interior of the vehicle in the seat configuration. The back surface may face and be positioned on a ground surface in the ladder or ramp configurations. The seat may include a seat back having a bottom end pivotally attached to the seat cushion. The bottom end may be oriented towards the back end. The seat back may be lockable in place relative to the seat cushion at an angle equal to or less than ninety degrees with at least one locking member. The seat may include a ladder or a ramp attached to the seat back usable to access or load the vehicle once converted.

20 Claims, 11 Drawing Sheets

(56) References Cited

U.S. PATENT DOCUMENTS

2018/0043796 A1* 2/2018 Rogers .................... B60R 9/10

FOREIGN PATENT DOCUMENTS

| DE | 102015012851 A1 | | 4/2016 | |
|----|----|----|----|----|
| FR | 2919235 A1 | | 1/2009 | |
| GB | 2529836 A | * | 3/2016 | ............... B60N 2/36 |
| JP | 2002036956 A | * | 2/2002 | ............. B60R 3/005 |

* cited by examiner

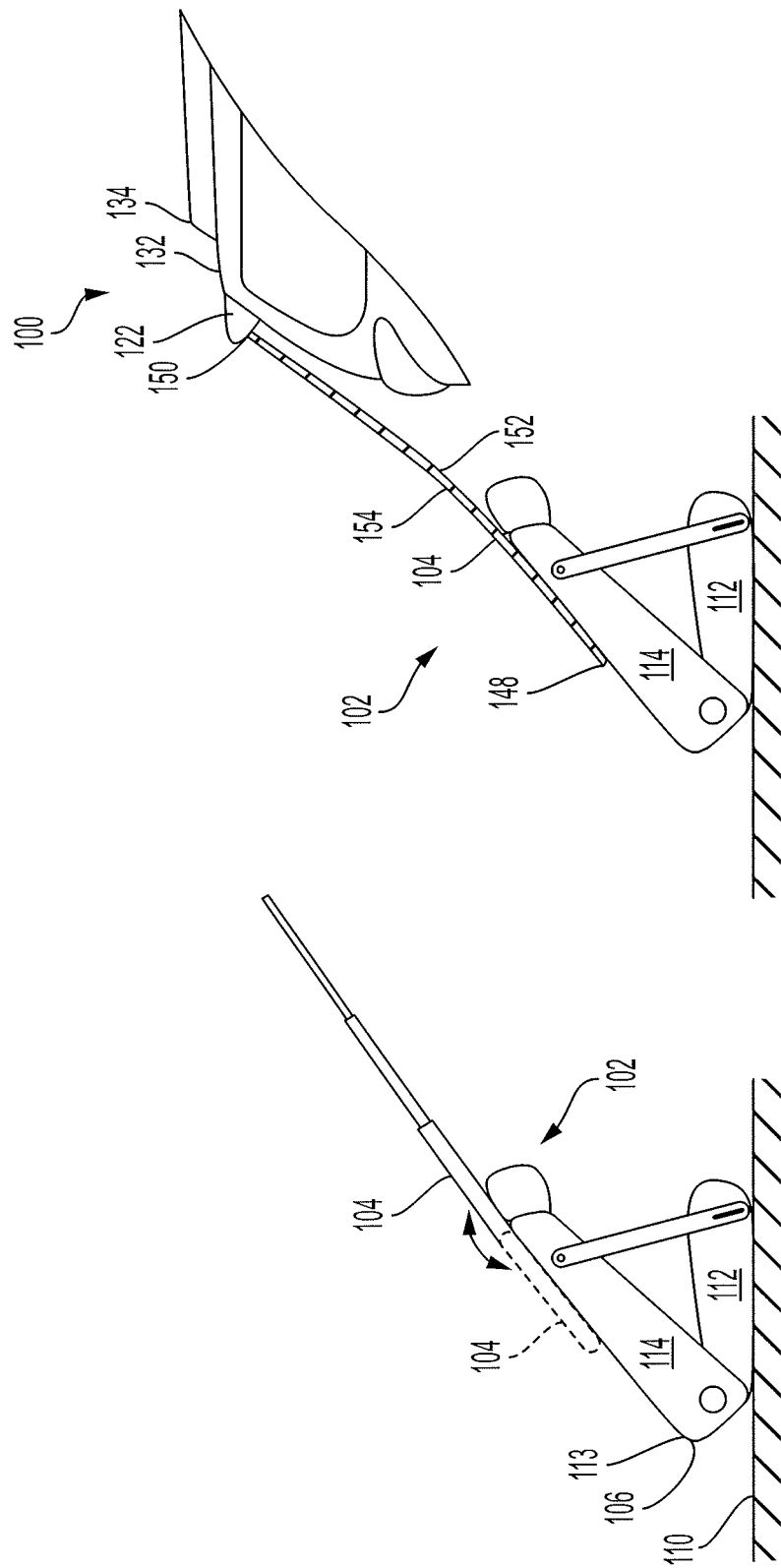

VEHICLE SEAT CONVERTIBLE INTO VEHICLE ACCESS AND LOADING TOOL

BACKGROUND

1. Field

The various aspects and embodiments described herein relate to apparatus for providing an automotive vehicle seat removable and convertible into a vehicle access and loading tool, such as a ladder or a ramp.

2. Description of the Related Art

Automotive vehicles may feature roof racks, truck beds, or trunks to carry cargo, store equipment (e.g., spare tire, fire extinguisher, first aid kit, etc.), and set up living spaces (e.g., tent, cot, sleeping bag, etc.). Such areas may be elevated from the ground such that reaching, accessing, and loading them provides to be difficult, especially in sport utility vehicles ("SUVs"), utility terrain vehicles ("UTVs"), and trucks, which tend to feature lifted bodies and large tires. Step bars on vehicles may be limited in added height and accessibility as they are generally installed along sides of vehicles for a restricted length and may be difficult to balance on due to their narrow widths and close proximity to the vehicle. Ladders attached to the exterior of the vehicle may reduce aerodynamics, add to the buzz, squeak, and rattle of vehicles ("BSR"), be difficult to climb due to having high inception points off the ground, and be cosmetically unappealing. External ladders and ramps detached from the vehicle may waste cargo space. As such, there is a need for improved vehicle access and loading tools.

SUMMARY

A removable vehicle seat convertible from a seat configuration to an access and loading tool configuration is disclosed herein. The seat in access and loading tool configuration may be a ladder, a ramp, or a combination of a ladder and a ramp.

In accordance with an embodiment of the present disclosure, there may be a removable vehicle seat convertible from a seat configuration into a ladder configuration. The seat may include a seat cushion. The seat cushion may have a back surface and a back end removably engaged with a floor of an interior of the vehicle in the seat configuration. The back surface may face and be positioned on a ground surface in the ladder configuration. The seat may include a seat back. The seat back may have a bottom end pivotally attached to the seat cushion. The bottom end may be oriented towards the back end. The seat back may be lockable in place relative to the seat cushion at an angle equal to or less than ninety degrees with at least one locking member in the ladder configuration. The seat may include a ladder attached to the seat back. The ladder may be climbable by a user in the ladder configuration.

The ladder may be pivotally attached to the seat back and rotated away from a rear surface of the seat back to a locked position in the ladder configuration. The ladder may form an angle equal to or less than ninety (90) degrees with the seat cushion in the locked position. The ladder may have telescoping legs that extend away from the seat back to a locked position in the ladder configuration to increase a climbable length of the ladder.

The ladder may be located on or recessed into a rear surface of the seat back. The seat back may have a caved back. The ladder may be located within or outside the caved back. The ladder may be a rope ladder attachable to the vehicle. Left and right legs of the ladder may be adaptable to support a ramp. Steps of the ladder may be pivotally attached to the left and right legs from a left end and a right end. The steps may have top and bottom surfaces. The steps may be rotated and locked in position such that the top or bottom surfaces are linear in a ramp configuration.

The at least one locking member of the ladder may have a first end and a second end pivotally attached to the seat cushion or the seat back from one of the first end and/or the second end. The at least one locking member may be lockingly engageable with the other of the seat cushion or the seat back from the other of the first end or the second end. The at least one locking member may be an armrest.

In accordance with an embodiment, there may be a removable vehicle seat convertible from a seat configuration into a ramp configuration. The seat may include a seat cushion. The seat cushion may have a back end and a bottom surface removably engaged with a floor of an interior of the vehicle in the seat configuration. The seat cushion may be attached to a tailgate or a bumper of the vehicle at a first angle. The bottom surface may define a first section of a ramp surface in the ramp configuration. The seat may include a seat back. The seat back may have a top end, a bottom end, and a rear surface pivotally attached to the seat cushion. The bottom end may be oriented towards the back end. The rear surface may define a second section of the ramp surface. The seat back may be locked at a second angle relative to the tailgate or the bumper of the vehicle such that the first and second ramp sections of the ramp surface are linear in the ramp configuration. The seat may include a headrest. The headrest may be attached to the top end. The headrest may be positioned on a resting surface to support the seat back and the seat cushion in the ramp configuration.

The first and second sections of the ramp surfaces may be reinforced with a unitary platform or a plurality of platforms made of an abrasion resistant material. A friction surface may be attachable to the headrest to prevent movement of the seat back relative to the resting surface in the ramp configuration. The resting surface may be cavity shaped and sized to receive the headrest located on the bumper or the tailgate in the ramp configuration.

The headrest may have a head resting portion and a mounting portion. The mounting portion may comprise at least one pin having a first end and a second end. The first end may be removably inserted into at least one hole in the head resting portion. The second end may be removably inserted into at least one hole in the top end in the seat configuration. The at least one pin may be detached from the head resting portion and attached to at least one receiving hole in the bumper or the tailgate of the vehicle in the ramp configuration.

In accordance with an embodiment, there may be a method of converting a removable vehicle seat from a seat configuration into an access and loading tool configuration. The method may include removing a seat cushion from a floor of an interior of the vehicle. The method may include positioning the seat cushion on a ground surface. A back surface of the seat cushion may face the ground surface. The method may include pivoting a seat back towards a front surface of the seat cushion. The method may include locking the seat back in place relative to the seat cushion at an angle equal to or less than ninety (90) degrees with at least one locking member. The method may include exposing a ladder or a ramp attached to the seat back.

The exposing step may include pivoting the ladder away from a rear surface of the seat back and locking the ladder at an angle equal to or less than ninety (90) degrees to the seat cushion. The exposing step may include attaching a rope ladder between the seat back and the vehicle. The ladder or the ramp may have telescoping legs that extend away from the seat back to a locked position in the access and loading tool configuration to increase a length of the ladder or the ramp. The steps of the ladder may be pivotally attached to the left and right legs from a left and a right end. The steps may have top and bottom surfaces. The ladder may be convertible to the ramp by rotating and locking the steps in position such that the top or bottom surfaces are linear.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

FIG. 4A illustrates the removable seat shown in FIG. 3 in a ladder or ramp configuration according to an aspect of the invention.

FIG. 4B illustrates the removable seat shown in FIG. 3 in a ladder configuration according to an aspect of the invention.

DETAILED DESCRIPTION

Figure 1:
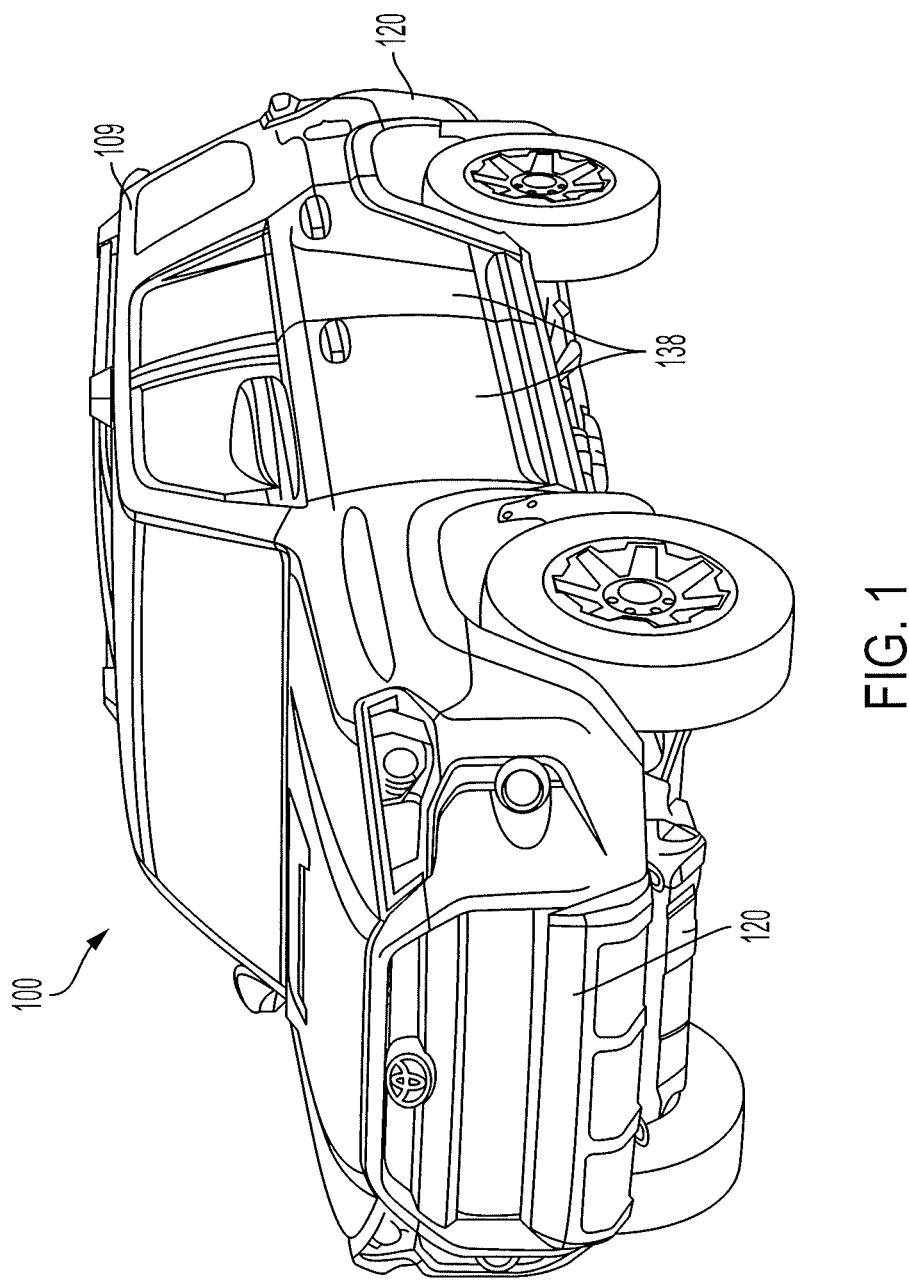
FIG. 1 illustrates a vehicle according to an aspect of the invention.

A vehicle 100 is shown in the FIGS. with a removable seat or removable seats 102 convertible from a seat configuration to an access and loading tool configuration. The seat 102 in the access and loading tool configuration may be a ladder 104, a ramp 106, or a combination of a ladder 104 and a ramp 106. The seat 102 may be removed from an interior 108 of the vehicle 100 and placed on the ground 110 next to the vehicle 100. The back 114 of the seat 102 may be tilted forward and feature the ladder 104 or the ramp 106. Alternatively, the seat 102 may be opened up and flipped over to its back side such that the ramp 106 or a combination of the ladder 104 and the ramp 106 is created. The seat 102 may be attached to the vehicle 100 (e.g., tailgate, roof, roof rack, bumper, etc.) from one end. The ladder 104 may advantageously allow its user to reach otherwise hard to reach places of the vehicle 100 that are high from the ground 110 (e.g., trunk, roof, roof rack, rear compartment, etc.). The ramp 106 may advantageously allow its user to load and unload cargo to and from such hard to reach places in or on the vehicle 100. The ladder 104 and/or the ramp 106 may be advantageously returned to the seat configuration when not in use and during transport to save space and help reduce the overall BSR of the vehicle 100.

In an embodiment, in initiating the conversion process, the seat 102 may be removed from the interior 108 of the vehicle 100 and set on the ground surface 110 in close proximity to the vehicle 100. In this position, a back surface 111 of a seat cushion 112 of the seat 102 may be facing the ground surface 110. Next, a seat back 114 attached to the seat cushion 112 may be pivoted towards the seat cushion 112 and locked in place at a narrow angle to the seat cushion 112. The ladder 104 and/or the ramp 106 may be attached to the seat back 114.

In an embodiment, in initiating the conversion process, the seat 102 may be removed from the interior 108 of the vehicle 100 and set on the ground surface 110 in close proximity to the vehicle 100. In this position, a rear surface 113 of the seat back 114 may be facing the ground surface 110. Next, the seat cushion 112 may be pivoted towards the seat back 114 and locked in place at a narrow angle to the seat back 114. The ladder 104 and/or the ramp 106 may be attached to the seat cushion 112.

In an embodiment, in initiating the conversion process, the seat 102 may be removed from the interior 108 of the vehicle 100 and a headrest 116 of the seat 102 may be set on the ground surface 110 or a resting surface 118. The resting surface 118 may be on a bumper 120 or a tailgate 122 of the vehicle 100 or on a bumper 220 or a tailgate 222 of a truck 200. In this position, the seat cushion 112 and the seat back 114 may be locked in position such that the back surface 111 of the seat cushion 112 and the rear surface 113 of the seat back 114 are facing away from the ground surface 110 or the resting surface 118 and form the ramp 106 having a linear surface.

The ability of the seat 102 to be removed from the vehicle 100 and converted into the ladder 104 or the ramp 106 allows for easier access to areas of the vehicle 100 that are generally difficult to reach and load (e.g., roof, trunk, bed, rear compartment, etc.). Further, the ability of the ladder 104 or the ramp 106 to return to the seat configuration provides a compact and useful storage solution until they are needed again. Transporting the ladder 104 or the ramp 106 in a fixed position as part of the seat 102 inside the vehicle 100 may reduce the BSR of the vehicle 100 relative to ladders and ramps carried on the exterior 109 of the vehicle 100 or in the interior 108 without securement (e.g., back seat, trunk, bed, etc.).

The FIGS. illustrate the removable vehicle seat 102. The seat 102 may be convertible from a seat configuration into an access and loading tool configuration (i.e., a ladder configuration, a ramp configuration). The seat 102 may include a seat cushion 112 having a back surface 111 and a back end 124 removably engaged with a floor 126 of an interior 108 of the vehicle 100 in the seat configuration. The back surface 111 may face and be positioned on a ground surface 110 in the access and loading tool configuration. The seat 102 may include a seat back 114 having a bottom end 128 pivotally attached to the seat cushion 112 with the bottom end 128 oriented towards the back end 124. The seat back 114 may be lockable in place relative to the seat cushion 112 at an angle equal to or less than ninety (90) degrees with at least one locking member in the access and loading tool configuration. The seat 102 may include a ladder 104 or a ramp 106 attached to the seat back 114.

Figure 3:
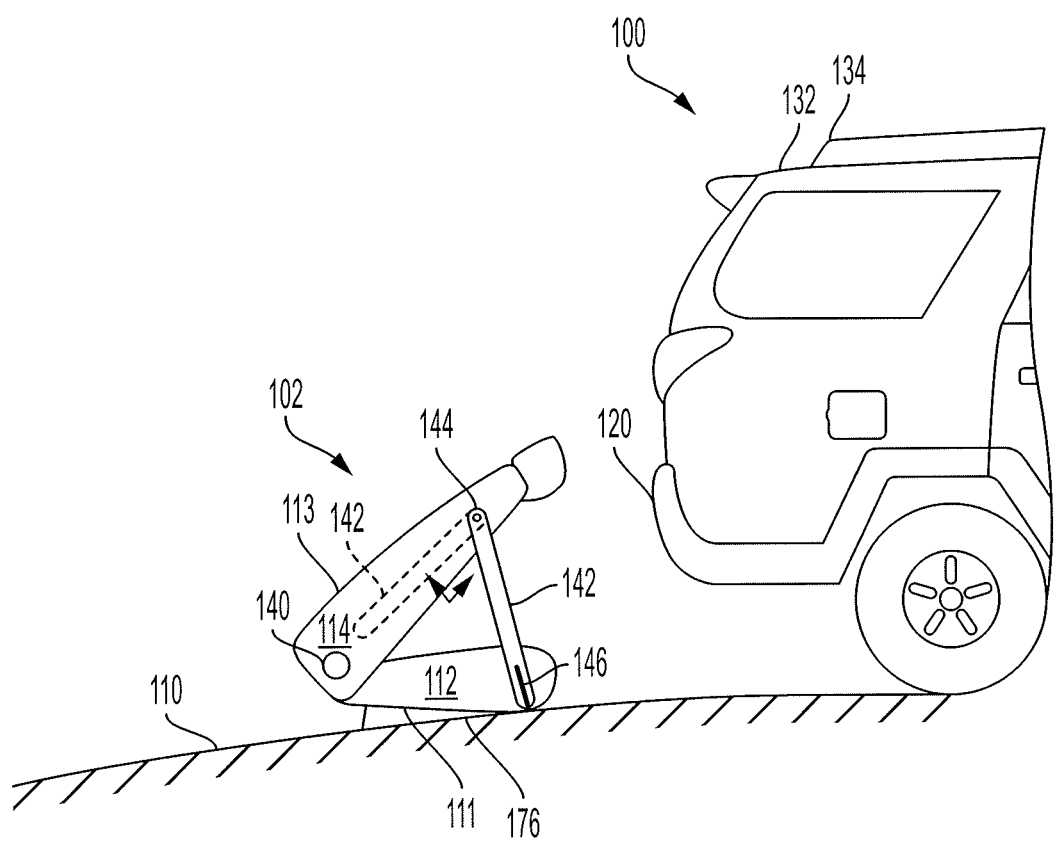
FIG. 3 illustrates the removable seat shown in FIG. 2 removed from the vehicle shown in FIG. 1 according to an aspect of the invention.

FIG. 1 illustrates the vehicle 100 having the removable and convertible seat 102 (see FIG. 3). The vehicle 100 is a conveyance capable of transporting a person, an object, or a permanently or temporarily affixed apparatus. The vehicle 100 may have an automatic or manual transmission. The vehicle 100 may be a self-propelled wheeled conveyance, such as a car, an SUV, a truck, a bus, a van or other motor or battery driven vehicle. For example, the vehicle 100 may be an electric vehicle, a hybrid vehicle, a plug-in hybrid vehicle, a fuel cell vehicle, or any other type of vehicle that includes a motor/generator. FIG. 1 depicts an SUV by example. FIGS. 6A-B depict a truck 200 by example. The vehicle 100 may have a bumper or bumpers 120 or a tailgate 122 (see FIG. 5) that the seat 102 may be attached or positioned in relation to.

Figure 2:
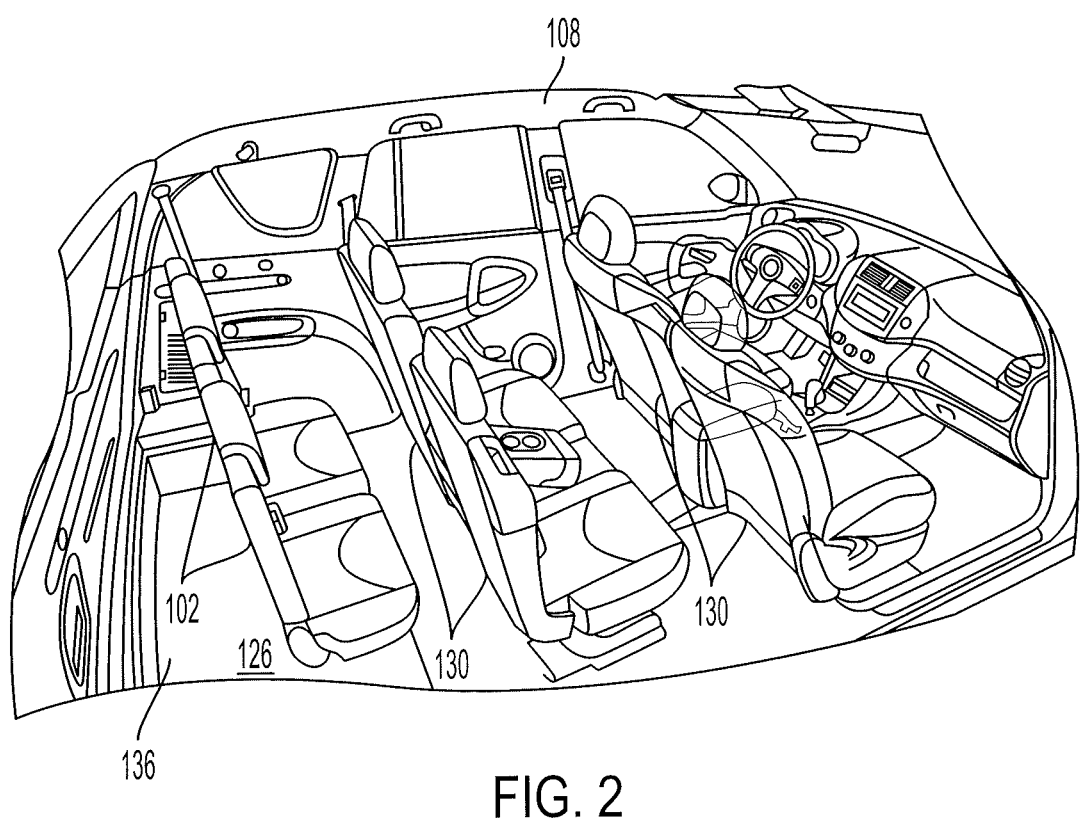
FIG. 2 illustrates an interior of the vehicle shown in FIG. 1 having a removable seat according to an aspect of the invention.

FIG. 2 illustrates the interior 108 of the vehicle 100 having the removable seats 102. In some embodiments, there may be a single seat 102. In some embodiment, there may be two or more seats 102. In some embodiments, the seats 102 may be a third row of seats, such as the seats 102 in FIG. 2. In some embodiments, the seats 102 may be in any other row of seats. The seats 102 may be next to seats 130. The removable seats 102 may be attached to the floor 126 of the interior 108 with a fastener. By example and not limitation, the fastener may be a latch. The latch or any other fastener used in attaching the seats 102 may be designed to engage and disengage quickly, frequently, and with relative ease compared to the seats 130, which may not be designed to be removed and reinstalled often (e.g., including many hard-to-reach screws). In some embodiments, the seats 102 may not be power seats that are electrically connected to a battery and seat adjustment system of the vehicle 100. This may reduce removal and reinstallation times as well as complexity of the removal and reinstallation processes of the seats 102. The seat 102 may have the external appearance of a conventional vehicle seat and function like one in the seat configuration. In some embodiments, the removable seats 102 and the seats 130 may have the same shape and size. In some embodiments, the removable seats 102 may be shaped or sized differently than the seats 130.

FIG. 3 illustrates the removable seat 102 removed from the vehicle 100 and positioned on the ground 110 and in front of the rear bumper 120 and the tailgate 122. In such embodiments, the ladder and ramp configurations may be used to load or unload cargo to the roof 132, for instance, when working with a roof rack 134, or the trunk 136 of the vehicle 100. Also, in such embodiments, a user or a pet of the user may use the ladder and ramp configurations to physically enter the vehicle 100 from an open tailgate 122 or climb on the roof 132. In some embodiments, the seat 102 may be positioned in front of one of the passenger or driver doors 138 (see FIG. 1) or a bumper 120 on the front of the vehicle 100. Different positionings of the seat 102 relative to the vehicle 100 may allow for different points of entry, access, and loading of the vehicle 100.

The seat 102 may have a seat cushion 112. A back surface 111 of the seat cushion 112 may face and rest on the ground 110. Depending on how flat the ground 110 is, the seat cushion 112 may or may not be leveled with the ground 110. In some embodiments, the seat 102 may have a leveling platform 176 that extends out of the back surface 111 of the seat cushion 112 to adjust the angle between the back surface 111 and the ground 110. The leveling platform 176 may allow the user to adjust the seat 102 to a desired position relative to the vehicle 100 regardless of the slope of the ground 110. FIG. 3 shows the leveling platform 176 raising a back end 124 of the seat cushion 112 from where the ground 110 is declined to compensate for the decline. In some embodiments, the seat 102 may be anchored to the ground 110. For example, stakes may be used to anchor the seat 102 to the ground from the seat cushion 112 or the seat back 114.

The seat 102 may have a seat back 114. The seat back 114 may be pivotally attached to the seat cushion 112. A pivot joint 140 may go through a bottom end 128 of the seat back 114 and the back end 124 of the seat cushion 112. The seat back 114 may recline (i.e., pivot away from the seat cushion 112) or fold in (i.e., pivot towards the seat cushion 112). The seat back 114 may be pivoted to be perpendicular to or angled towards the seat cushion 112. Once such an angle is formed, the seat back 114 may be locked into place relative to the seat cushion 112. The locking may be achieved via a locking member or members 142. In some embodiments, the locking members 142 may be arms as shown in FIG. 3. The arms 142 may stop movement of the seat back 114 relative to the seat cushion 112 or vice versa. In some embodiments, the arms 142 may be pivotally attached to the seat back 114 from a first end 144 and removably engaged with the seat cushion 112 from a second end 146 as shown in FIG. 3. For example, the second end 146 may have a hole that can receive a pin attached to the seat cushion 112. In some embodiments, the arms 142 may be tucked back when not in use as shown by arrows and the dashed lines in FIG. 3. In some embodiments, the arms 142 may be detached from the seat 102 and stored away. In some embodiments, the arms 142 may be armrests in the seat configuration. In some embodiments, the arms 142 may be pivotally attached to the seat cushion 112 from the first end 144 and removably engaged with the seat back 114 from the second end 146. The ladder 104 or the ramp 106 may be attached to the seat back 114.

The rear surface 113 of the seat back 114 may face and rest on the ground 110. In such embodiments, the seat cushion 112 may be pivoted to be perpendicular to or angled towards the seat back 114. The ladder 104 or the ramp 106 may be attached to the seat cushion 112.

FIG. 4A illustrates a configuration or version of the seat 102. The seat 102 may have a ladder 104 that is extendable away from the seat 102 to increase reach of the ladder 104. In some embodiments, the ladder 104 may be telescoping as shown in FIG. 4A. In some embodiments, the ladder 104 may be pivotally attached to the seat back 114. In such embodiments, the ladder 104 may be rotated away from the rear surface 113 of the seat back 114 from a storable position as shown by the arrows and the dashed lines in FIG. 4A. In some embodiments, the ladder 104 may have a section that may be on or facing the rear surface 113 of the seat back 114. Having this section may provide for added convenience by enabling the user to climb up the ladder 104 by taking a smaller initial step. The section may telescope down, or towards the ground 110, to lower the first step of the ladder 104. The ladder 104 may be constructed from metal, wood, plastic, or any other material known in the art in ladder manufacturing. In some embodiments, the rear surface 113 of the seat back 114 may be used as a ramp 106 while the ladder 104 is extended out. In some embodiments, a flat hard surface, such as a metal, plastic, or wooden board, may be placed over the ladder 104 to function as a ramp 106.

The seat 102 may have a ramp 106 that is extendable away from the seat 102 to increase reach of the ramp 106. In some embodiments, the ramp 106 may be telescoping. In some embodiments, the ramp 106 may be pivotally attached to the seat back 114. In such embodiments, the ramp 106 may be rotated away from the rear surface 113 of the seat back 114 from a storable position. The ramp 106 may be constructed from metal, wood, plastic, or any other material known in the art in ramp manufacturing.

FIG. 4B illustrates another configuration or version of the seat 102. A rope ladder 104 may be attached to the seat back 114 as show. The rope ladder 104 may have a plurality of legs 152 and at least one step 154. The rope may be made from natural fibers (e.g., linen, cotton, and hemp) or synthetic fibers (e.g., polyester, nylon, polypropylene). In some embodiments, the steps 154 may not have a rope structure. By example and not limitation, the steps 154 may be bars or platforms made of metal, plastic, or wood. The rope ladder 104 may be attached to the seat cushion 112. The rope ladder 104 may be attached to the seat 102 from a first end 148 and attached to the vehicle 100 from a second end 150. In some embodiments, the rope ladder 104 may be attached to the tailgate 122 as shown in FIG. 4B. In some embodiments, the rope ladder 104 may be attached to the roof 132 or the roof rack 134. In some embodiments, the rope ladder 104 may be attached to the bumper 120 (see FIG. 3). The attachments of the first and second ends 150 may be facilitated by the same or different fasteners. By example and not limitation, the fasteners may include hooks, pins, clips, and ties. In some embodiments, there may be multiple or different placements or configurations of attachment points both on the vehicle 100 and on the seat 102. In such embodiments, a set of attachment points may be chosen based on desired ladder reach and function.

The first end 148 may be attached to the rear surface 113 of the seat back 114 as shown in FIG. 4B. In some embodiments, the rope ladder 104 may be fixed to the seat 102 from the first end 148 (i.e., not designed to be detached). In such embodiments, the rope ladder 104 may be folded, rolled, or bunched into a compact state to be stored in the seat configuration. In such embodiments, the rope ladder 104 may be stored in a bag, sack, or a box attached the seat 102.

Figure 4D:
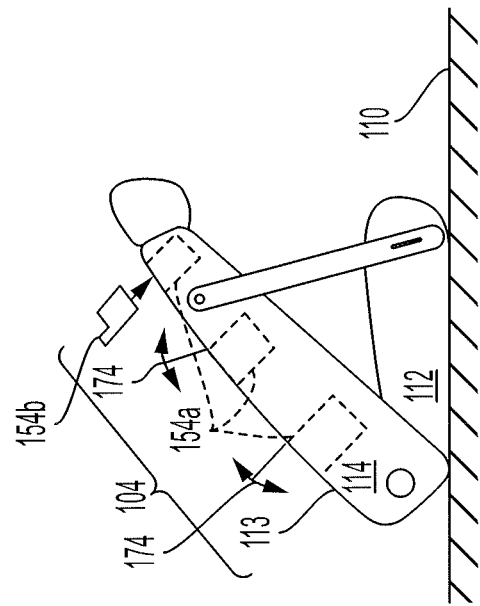
FIG. 4D illustrates the removable seat shown in FIG. 3 in a ladder configuration according to an aspect of the invention.
Figure 4C:
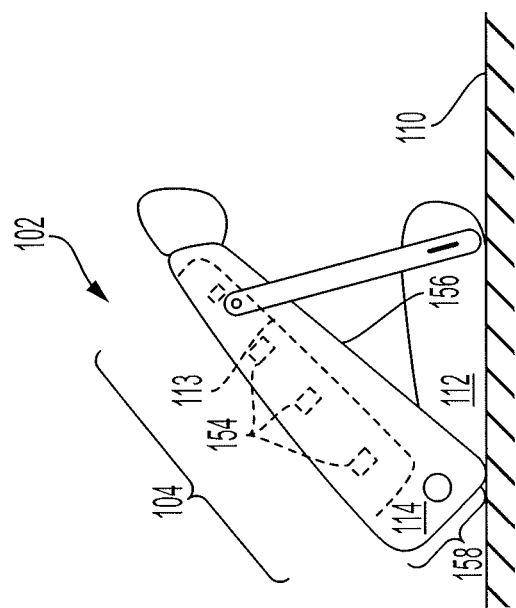
FIG. 4C illustrates the removable seat shown in FIG. 3 in a ladder configuration according to an aspect of the invention.

FIG. 4C illustrates another configuration or version of the seat 102. The seat back 114 may be caved such that the rear surface 113 is recessed towards a front surface 156 of the seat back 114. In some embodiments, steps 154 may be within a cavity 158 defined by the caved rear surface 113 as shown in FIG. 4C. In some embodiments, the steps 154 may extend out of the cavity 158. In some embodiments, the steps 154 may be entirely outside the cavity 158. The cavity 158 may serve as a space to conceal the steps 154 or provide room for the user's hands and feet when climbing the steps 154.

FIG. 4D illustrates another configuration or version of the seat 102. Steps 154a of the ladder 104 may be recessed into the rear surface 113 of the seat back 114. The steps 154a may be recessed enough to allow at least part of the user's hands and feet to enter within when climbing the ladder 104. In some embodiments, the steps 154a may have covers 174 that can conceal the steps 154 when the steps 154a are not being used. The covers 174 may sit flush with the rear surface 113 of the seat back 114. The covers 174 may be attached to the seat 102 and hinge up and down to open and close the steps 154a as shown in FIG. 4D. Alternatively, the covers 174 may be separate from the seat 102 prior to attachment to cover the steps 154a. This may cosmetically improve the appearance of the seat 102 and make the seat 102 resemble a conventional vehicle seat.

In some embodiments, external steps 154b may be inserted into housings 160 on the rear surface 113 of the seat back 114 as shown in FIG. 4D. The external steps 154b may fit snugly in the housings 160. The external steps 154b may partially extend out of the housings 160. The user may step on and grab the portion extending out of the housings 160 while climbing the ladder 104. The external steps 154b may be made from metal, plastic, or wood. The external steps 154b may be stored in a bag, sack, or box attached or detached to the seat 102 when not being used. For example, the external steps 154b may be stored under or inside the seat cushion 112 in a concealed fashion in the seat configuration.

Figure 4E:
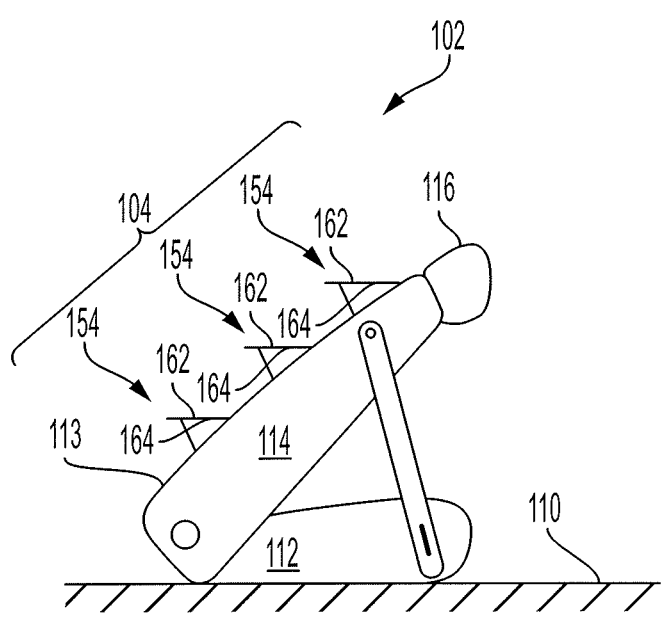
FIG. 4E illustrates the removable seat shown in FIG. 3 in a ladder configuration according to an aspect of the invention.

FIG. 4E illustrates another configuration or version of the seat 102. The seat 102 may have a ladder 104 having steps 154 that protrude from the rear surface 113 of the seat back 114. The steps 154 may be pivotally attached to the seat back 114 from one or both ends. In the ladder configuration, the steps 154 may be rotated out so that a top surface 162 of each step 154 is a stepping surface as shown in FIG. 4E. In some embodiments, a bottom surface 164 of each step 154 is the stepping surface. The stepping surface may be coated or lined with a rough non-slip material. When the steps 154 are not being used or a ramp configuration is desired, the steps 154 may be rotated back towards the seat back 114. Once rotated back, the top surface 162 or the bottom surface 164 of each step 154 may form a linear surface that defines a ramp 106. The headrest 116 may be removed to have a clear path for the ramp 106. In some embodiments, the steps 154 may be pulled out and pushed in with springs, including pneumatic and coil springs.

Figure 4G:
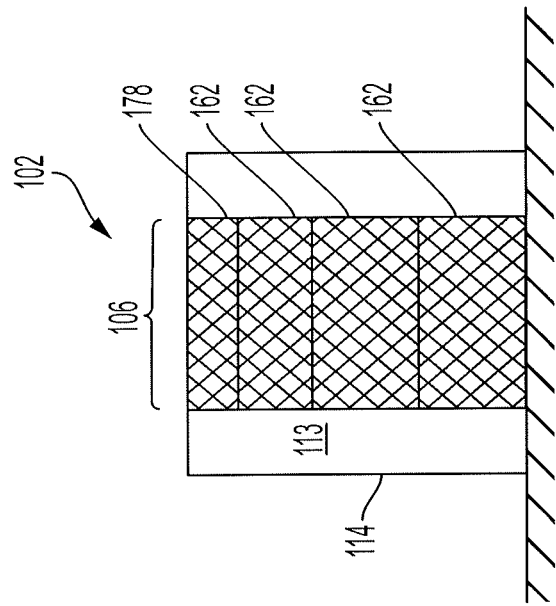
FIG. 4G illustrates a front view of the removable seat shown in FIG. 4E in a ramp configuration according to an aspect of the invention.
Figure 4F:
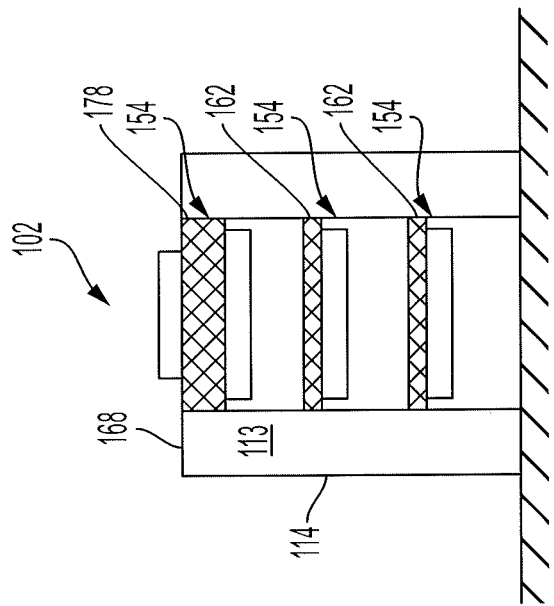
FIG. 4F illustrates a front view of the removable seat shown in FIG. 4E in the ladder configuration according to an aspect of the invention.

FIG. 4F illustrates a front view of the seat 102 shown in FIG. 4E in ladder configuration. The steps 154 are rotated out and each of the top surfaces 162 define a stepping surface. There may be a surface 178 on the rear surface 113 of the seat back 114 between the steps 154 and the top end 168 of the seat back 114 coated or lined with a rough non-slip material. The non-slip surface 178 may be used to wheel or drag cargo in and out of the vehicle and allow the user or the user's pets to walk up and down the ramp 106 without unwanted slippage when the seat 102 is in the ramp configuration as shown in FIG. 4G. The top surfaces 162 or the stepping surfaces of the steps 154 may be coated or lined with the same rough non-slip material or a different one.

FIG. 4G illustrates a front view of the seat 102 shown in FIG. 4E in ramp configuration. The steps 154 are rotated back towards the seat back 114, and the top surfaces 162 and the non-slip surface 178 form a linear surface that defines the ramp 106. The headrest 116 (see FIG. 4F) is removed to have a clear path for the ramp 106. In some embodiments, the ramp 106 may be offset from the rear surface 113 of the seat back 114. In such embodiments, the offset may be out of the seat back 114 or in the seat back 114. In some embodiments, the ramp 106 may be flush with the rear surface 113 of the seat back 114.

Figure 5:
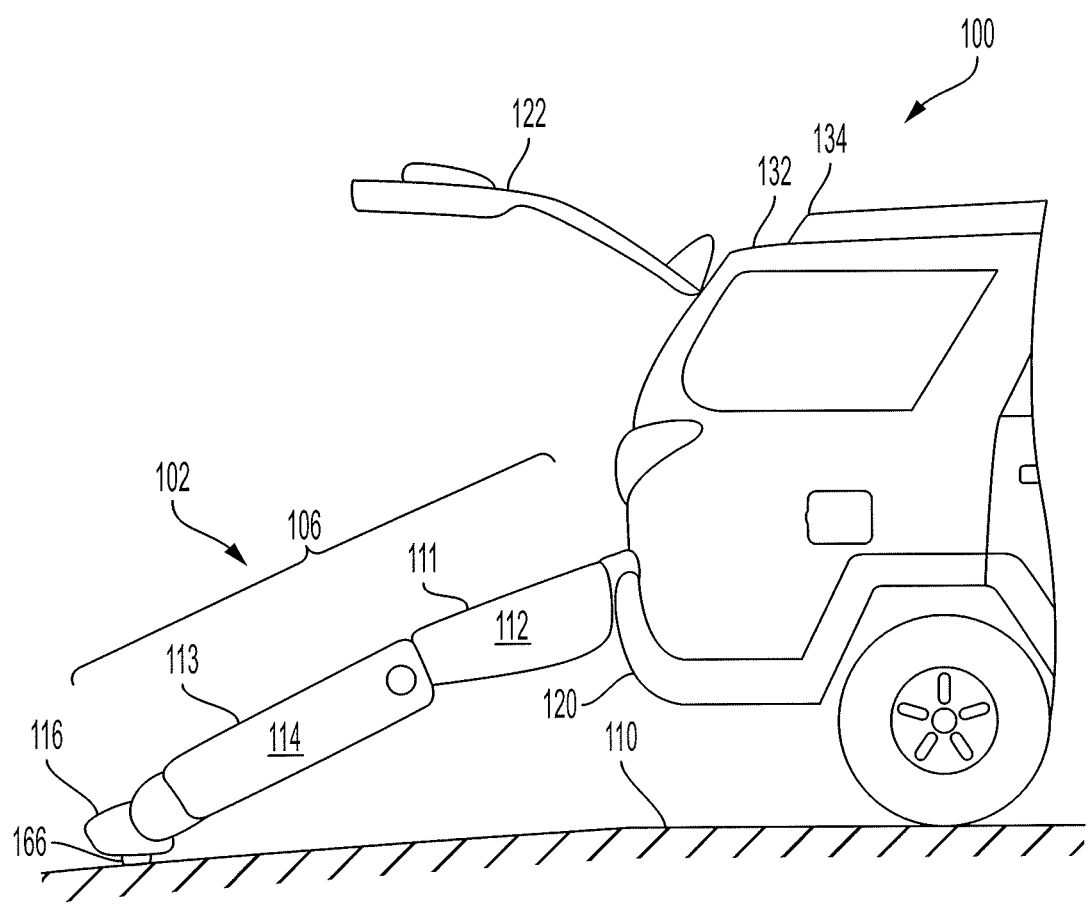
FIG. 5 illustrates the removable seat shown in FIG. 2 in a ramp configuration according to an aspect of the invention.
Figure 6A:
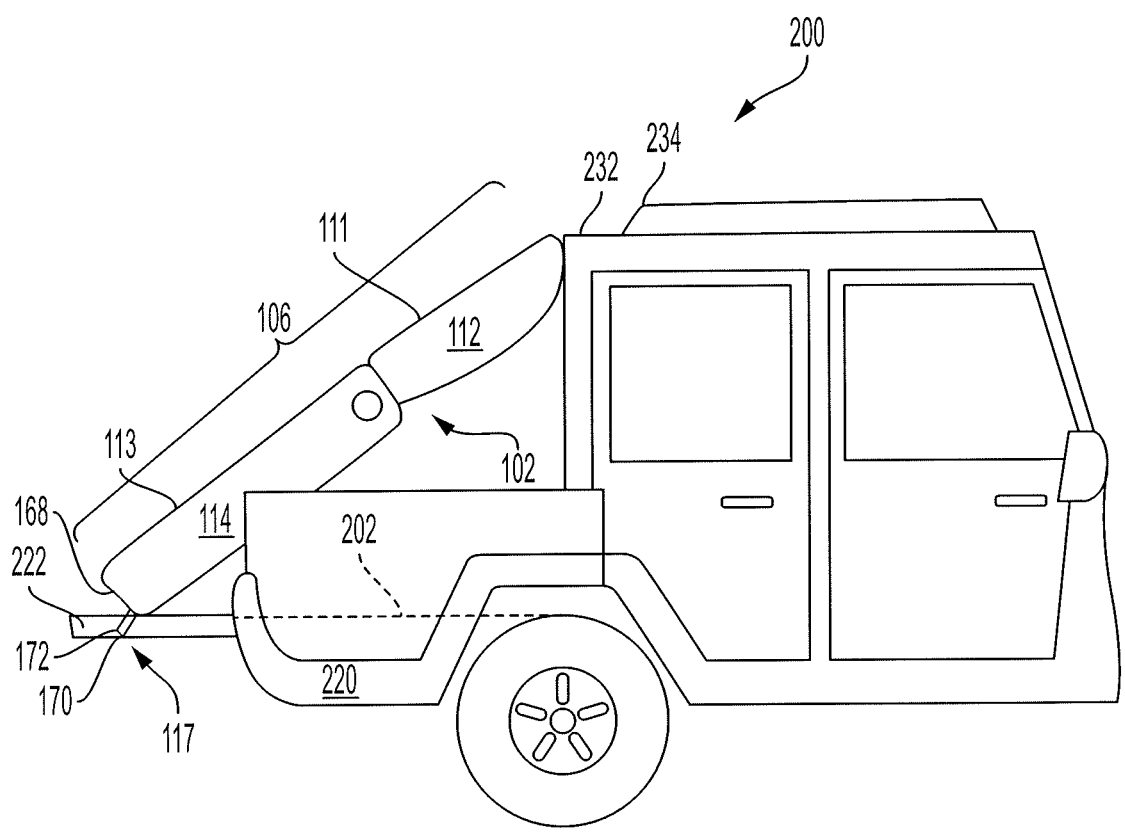
FIG. 6A illustrates a removable seat of a truck in a ramp configuration according to an aspect of the invention.
Figure 6B:
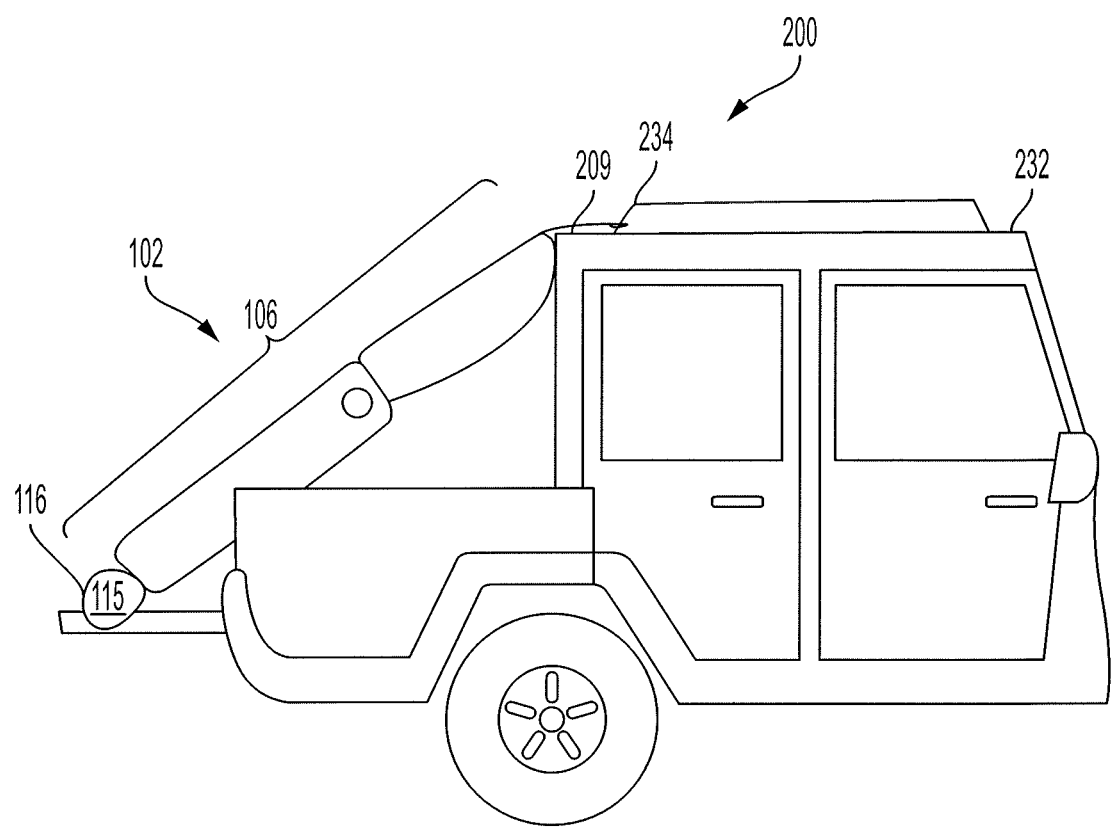
FIG. 6B illustrates a removable seat of a truck in a ramp configuration according to an aspect of the invention.

FIG. 5 illustrates another configuration or version of the seat 102. The seat 102 may be convertible to a ramp configuration. In the ramp configuration, the seat 102 may be rested on the ground 110. The headrest 116 may have a friction surface 166 in direct contact with the ground 110. The friction surface 166 may help mitigate unwanted slip during use of the ramp 106. The friction surface 166 may be a separate piece detachable to use the headrest 116 to rest a head and attachable in the ramp configuration. Also, in the ramp configuration, the seat cushion 112 and the seat back 114 may be positioned relative to each other such that the rear surface 113 of the seat back 114 and the back surface 111 of the seat cushion 112 form a linear surface defining the ramp 106. The ramp 106 may be inclined up to the vehicle 100. In some embodiments, the seat 102 may be attached to the bumper 120 of the vehicle 100 as shown in FIG. 5. In some embodiments, the seat 102 may be attached to the tailgate 122 when the tailgate is in an open position. In some embodiments, the seat 102 may be attached to the roof 132 or the roof rack 134. The attachment may be facilitated by a conventional fastener, including hooks, pins, and clips. The ramp 106 may be used for various tasks, including loading and unloading wheeled objects, sliding cargo, and boarding and deboarding pets into or onto the vehicle 100. The ramp 106 may be made from a durable and abrasion resistant material (e.g., rubber, ballistic nylon, Rhino liner coating, etc.). In some embodiments, the back surface 111 of the seat cushion 112 and the rear surface 113 of the seat back 114 may be made from fabric or leather. In such embodiments, a durable and abrasion resistant ramp surface may be attached over the back surface 111 and the rear surface 113.

FIG. 6A illustrates the seat 102 convertible into a ramp 106. In some embodiments, the ramp 106 may be used with a truck 200 as shown. In some embodiments, the ramp 106 may be leaned against or attached to a roof 232 as shown or a roof rack 234 of the truck 200. In some embodiments, the ramp 106 may be leaned against or attached to a bumper 220 of the truck 200. In some embodiments, the ramp 106 may be leaned against or attached to a tailgate 222 of the truck 200. The attachment may be facilitated by a conventional fastener, including hooks, pins, and clips. In the ramp configuration, the seat 102 may be positioned on a resting surface 118. In some embodiments, the resting surface 118 may be on the tailgate 222 as shown. In some embodiments, the resting surface 118 may be on a bed 202 of the truck 200. In some embodiments, the resting surface 118 may be on the bumper 220. A headrest portion 115 of the headrest 116 (see FIG. 6B) attached to a top end 168 of the seat back 114 with one or more pins 117 may be detached from the pins 117 to expose ends 170 of the pins 117. The pins 117 may each be inserted into a receiving pin hole 172 from the exposed ends 170. In some embodiments, the pin holes 172 may be on the tailgate 222 as shown in FIG. 6A. In some embodiments, the pin holes 172 may be on the bumper 220. In some embodiments, the pin holes 172 may be on the bed 202 of the truck 200. The entirety of the pins 117 may be retracted into the seat back 114 from the top end 168 when the headrest 116 is not desired in the seat configuration. For example, the retraction and extension of the pins 116 may be facilitated with a spring mechanism. The pins 117 may be retracted by pushing down on them and then extended back up by pushing down a second time. The length of the pins 117 that extend out of the top end 168 may be adjusted as desired.

In the ramp configuration, the seat cushion 112 and the seat back 114 may be positioned relative to each other such that the rear surface 113 of the seat back 114 and the back surface 111 of the seat cushion 112 form a linear surface defining the ramp 106. The ramp 106 may be used for various tasks, including loading and unloading wheeled objects, sliding cargo, and boarding and deboarding pets into or onto the vehicle 100. The ramp 106 may be made from a durable and abrasion resistant material (e.g., rubber, ballistic nylon, Rhino liner coating, etc.). In some embodiments, the back surface 111 of the seat cushion 112 and the rear surface 113 of the seat back 114 may be made from fabric or leather. In such embodiments, a durable and abrasion resistant ramp surface may be attached over the back surface 111 and the rear surface 113.

FIG. 6B illustrates a version or configuration of the seat 102 convertible into a ramp 106. The seat 102 may have the specifications of the seat 102 shown in FIG. 6A, except the headrest portion 115 of the headrest 116 is not detached from the seat 102 in the ramp configuration, and the resting surface 118 is shaped and sized to receive the headrest portion 115. In some embodiments, the seat 102 may be leaned against an exterior 209 of the truck 200. In some embodiments, the seat 102 may be leaned against or attached to the roof 232 or the roof rack 234 as shown. The attachment may be facilitated by fasteners such as hooks, pins, and clips.

Figure 6C:
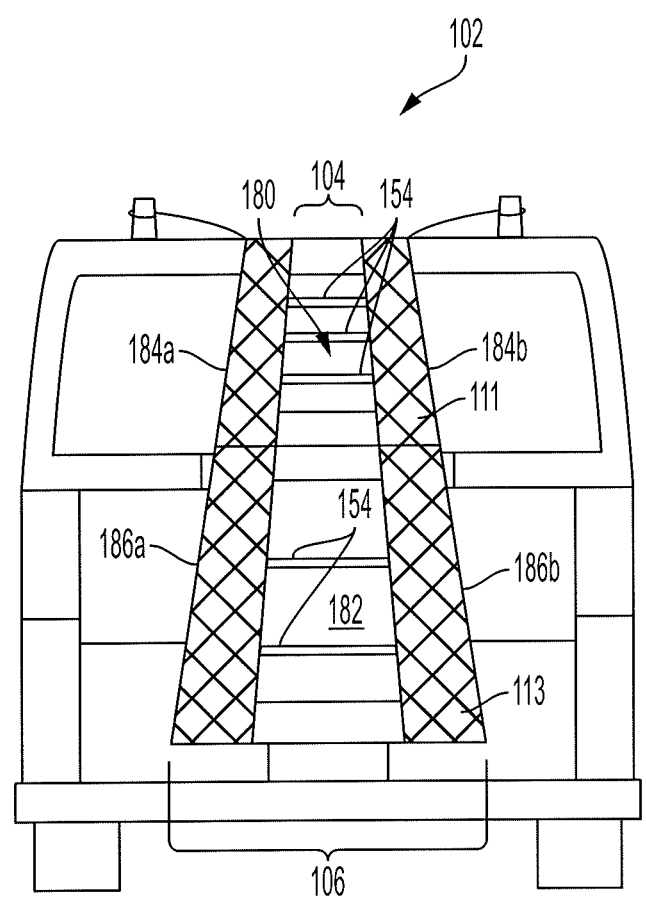
FIG. 6C illustrates a front view of the removable seat shown in FIG. 6B in a ramp and ladder configuration according to an aspect of the invention.

FIG. 6C illustrates a front view of the seat 102 shown in FIG. 6B in a ramp and ladder configuration. A central strip 180 of the back surface 111 of the seat cushion 112 and a central strip 182 of the rear surface 113 of the seat back 114 aligned with that of the back surface 111 may define a ladder 104. The ladder 104 may have steps 154 that do not extend out beyond the back surface 111 and the rear surface 113. In some embodiments, the central strips 180,182 may be caved in. This may create room for the steps 154 to be within the seat back 114 and the seat cushion 112 and not have the steps 154 extend out beyond the back surface 111 and the rear surface 113. In some embodiments, the steps 154 may be recessed from the back surface 111 and the rear surface 113. This may allow for a clear path for the ramp 106 defined by left and right strips 184a,b, 186a,b on the back surface 111 and the rear surface 113, respectively. The left and right strips 184a,b, 186a,b may be coated or lined with a rough non-slip material. The steps 154 may be coated or lined with the same rough non-slip material or a different one. The user may simultaneously use the seat 102 as a ladder 104 by staying within the central strips 180, 182, and as a ramp 106 by aligning things traveling up and down with the left and right strips 184a,b, 186a,b. The central strips 180, 182 may be covered with covers that sit flush with the left and right strips 184a,b, 186a,b if the ladder 104 is not desired or needed, or to increase the surface area of the ramp 106.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A removable vehicle seat convertible from a seat configuration into a ladder configuration, comprising:
    a seat cushion having a back surface and a back end removably engaged with a floor of an interior of the vehicle in the seat configuration, the back surface facing and being positioned on a ground surface in the ladder configuration;
    a seat back having a bottom end pivotally attached to the seat cushion, the bottom end being oriented towards the back end, the seat back being lockable in place relative to the seat cushion at an angle equal to or less than ninety degrees with at least one locking member in the ladder configuration; and a ladder attached to the seat back, the ladder being climbable by a user in the ladder configuration.

2. The removable vehicle seat of claim 1, wherein the ladder is pivotally attached to the seat back and rotated away from a rear surface of the seat back to a locked position in the ladder configuration, the ladder forming an angle equal to or less than ninety degrees with the seat cushion in the locked position.

3. The removable vehicle seat of claim 1, wherein the ladder has telescoping legs that extend away from the seat back to a locked position in the ladder configuration to increase a climbable length of the ladder.

4. The removable vehicle seat of claim 1, wherein the ladder is located on or recessed into a rear surface of the seat back.

5. The removable vehicle seat of claim 1, wherein the seat back has a caved back and the ladder is located within or outside the caved back.

6. The removable vehicle seat of claim 1, wherein the ladder is a rope ladder attachable to the vehicle.

7. The removable vehicle seat of claim 1, wherein left and right legs of the ladder are adaptable to support a ramp.

8. The removable vehicle seat of claim 7, wherein steps of the ladder are pivotally attached to the left and right legs from a left and a right end, the steps having top and bottom surfaces, the steps rotated and locked in position such that the top or bottom surfaces are linear in a ramp configuration.

9. The removable vehicle seat of claim 1, wherein the at least one locking member has a first end and a second end pivotally attached to the seat cushion or the seat back from one of the first and second ends, the at least one locking member being lockingly engageable with the other of the seat cushion or the seat back from the other of the first and second ends.

10. The removable vehicle seat of claim 9, wherein the at least one locking member is an armrest.

11. A removable vehicle seat convertible from a seat configuration into a ramp configuration, comprising:

a seat cushion having a back end and a bottom surface removably engaged with a floor of an interior of the vehicle in the seat configuration, the seat cushion being attached to a tailgate or a bumper of the vehicle at a first angle and the bottom surface defining a first section of a ramp surface in the ramp configuration;

a seat back having a top end, a bottom end, and a rear surface pivotally attached to the seat cushion, the bottom end being oriented towards the back end, the rear surface defining a second section of the ramp surface and the seat back being locked at a second angle relative to the tailgate or the bumper of the vehicle such that the first and second ramp sections of the ramp surface are linear in the ramp configuration; and a headrest attached to the top end, the headrest being positioned on a resting surface to support the seat back and the seat cushion in the ramp configuration.

12. The removable vehicle seat of claim 11, wherein the first and second sections of the ramp surfaces are reinforced with a unitary platform or a plurality of platforms made of an abrasion resistant material.

13. The removable vehicle seat of claim 11, wherein a friction surface is attachable to the headrest to prevent movement of the seat back relative to the resting surface in the ramp configuration.

14. The removable vehicle seat of claim 11, wherein the resting surface is a cavity shaped and sized to receive the headrest located on the bumper or the tailgate in the ramp configuration.

15. The removable vehicle seat of claim 11, wherein the headrest has a head resting portion and a mounting portion, the mounting portion comprising at least one pin having a first end and a second end, the first end being removably inserted into at least one hole in the head resting portion and the second end being removably inserted into at least one hole in the top end in the seat configuration, the at least one pin being detached from the head resting portion and attached to at least one receiving hole in the bumper or the tailgate of the vehicle in the ramp configuration.

16. A method of converting a removable vehicle seat from a seat configuration into an access and loading tool configuration, the method comprising:

removing a seat cushion from a floor of an interior of the vehicle;

positioning the seat cushion on a ground surface, a back surface of the seat cushion facing the ground surface;

pivoting a seat back towards a front surface of the seat cushion;

locking the seat back in place relative to the seat cushion at an angle equal to or less than ninety degrees with at least one locking member; and exposing a ladder or a ramp attached to the seat back.

17. The method of claim 16, wherein the exposing step includes pivoting the ladder away from a rear surface of the seat back and locking the ladder at an angle equal to or less than ninety degrees to the seat cushion.

18. The method of claim 16, wherein the exposing step includes attaching a rope ladder between the seat back and the vehicle.

19. The method of claim 16, wherein the ladder or the ramp has telescoping legs that extend away from the seat back to a locked position in the access and loading tool configuration to increase a length of the ladder or the ramp.

20. The method of claim 16, wherein steps of the ladder are pivotally attached to the left and right legs from a left and a right end, the steps having top and bottom surfaces, the ladder being convertible to the ramp by rotating and locking the steps in position such that the top or bottom surfaces are linear.

* * * * *